United States Patent
Kotaka

(10) Patent No.: US 8,761,530 B2
(45) Date of Patent: Jun. 24, 2014

(54) APPARATUS AND METHOD TO CONTROL TARGET CODE AMOUNT

(75) Inventor: Naohiko Kotaka, Tokyo (JP)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 13/441,314

(22) Filed: Apr. 6, 2012

(65) Prior Publication Data

US 2012/0301041 A1 Nov. 29, 2012

(30) Foreign Application Priority Data

May 23, 2011 (JP) ................................. 2011-114904

(51) Int. Cl.
*G06K 9/36* (2006.01)

(52) U.S. Cl.
USPC ...................................... 382/238; 375/240.02

(58) Field of Classification Search
None
See application file for complete search history.

(56) References Cited

U.S. PATENT DOCUMENTS

| | | | |
|---|---|---|---|
| 2008/0151076 A1* | 6/2008 | Takane | 348/231.99 |
| 2009/0135902 A1* | 5/2009 | Nakagomi et al. | 375/240.02 |
| 2009/0238266 A1* | 9/2009 | Saito et al. | 375/240.03 |
| 2010/0172410 A1* | 7/2010 | Wada et al. | 375/240.02 |
| 2011/0064134 A1* | 3/2011 | Nakagomi et al. | 375/240.02 |
| 2012/0328006 A1* | 12/2012 | Oishi | 375/240.03 |

FOREIGN PATENT DOCUMENTS

JP  2009-118097  5/2009

\* cited by examiner

*Primary Examiner* — Vu Le
*Assistant Examiner* — Samah Beg
(74) *Attorney, Agent, or Firm* — Sony Corporation

(57) ABSTRACT

A rate control unit adjusts a target code amount that is a target of a code amount when a coding object image is coded based on a state of a capturing unit at the time of capturing the coding object image that is an object of coding, and an orthogonal transformation unit, a quantization unit, and a variable-length coding unit code the coding object image in accordance with the adjusted target code amount. The present technology, for example, can be applied to a coding device that codes each image obtained by capturing of the capturing unit.

17 Claims, 5 Drawing Sheets

APPARATUS AND METHOD TO CONTROL TARGET CODE AMOUNT

BACKGROUND

The present technology relates to a coding device, a coding method, and a program, and in particular, for example, a coding device, a coding method, and a program, which can control code amounts at the time of coding to inhibit image degradation at the time of decoding.

For example, among coding schemes such as a moving picture expert group (MPEG) that codes images using a correlation between images that become coding objects, a technique of controlling a code amount at the time of coding each image to inhibit image degradation at the time of decoding is proposed.

According to the technique of controlling the code amount, the code amount of each image at the time of coding is controlled by feeding back parameters such as a code amount obtained by coding each image and a quantization scale used at the time of coding (see Japanese Patent Laid-Open Publication No. 2009-118097).

SUMMARY

However, for example, when each image that becomes a coding object is an image to be obtained by capturing in a capturing unit, the correlation between images is changed in accordance with a state of the capturing unit at the time of capturing.

That is, for example, when a rapid zoom-in or zoom-out (hereinafter, referred to as simply a zoom) is carried out by the capturing unit, the correlation between images is relatively decreased.

In this case, in the technique of controlling the code amount described above, it is necessary to predict images that become coding objects and control that the code amount of the images that are coded with reference to the obtained prediction images (e.g., P and B pictures in the case of MPEG) becomes larger in order to inhibit image degradation at the time of decoding.

In addition, for example, when the rapid zoom or the like is not carried out by the capturing unit, the correlation between images is relatively increased.

In this case, in the technique of controlling the code amount described above, it is necessary to control that the code amounts of the images referred to as the prediction images (e.g., I and P pictures in the case of MPEG) are increased in order to inhibit image degradation at the time of decoding.

However, in the technique of controlling the code amount described above, the code amount is not controlled based on a state of the capturing unit. Accordingly, when the rapid zoom or the like is carried out by the capturing unit, controlling the code amount following the rapid zoom or the like of the capturing unit is difficult to perform, and the image degradation thus occurs at the time of decoding.

The present technology is made in consideration of the above situation and enables the image degradation at the time of decoding to be inhibited regardless of the state of the capturing unit.

A coding device according to an embodiment of the present technology includes an adjustment unit configured to adjust a target code amount that is a target of a code amount when coding a coding object image, based on a state of a capturing unit at the time of capturing the coding object image that is an object of coding; and a coding unit configured to code the coding object image in accordance with the adjusted target code amount.

The adjustment unit may perform adjustment by allocating a larger target code amount to one of a first coding object image coded with reference to a prediction image obtained by predicting the coding object image and a second coding object image referred to as the prediction image, based on the state of the capturing unit.

The adjustment unit may adjust the target code amount based on a state of zoom of the capturing unit at the time of capturing the coding object image.

The adjustment unit may perform adjustment by allocating the larger target code amount to the first coding object image when the zoom is performed at a speed having a predetermined threshold value or higher and allocating the larger target code amount to the second coding object image when the zoom performed at the speed having the predetermined threshold value or higher is finished.

The adjustment unit may adjust the target code amount based on a state of focus of the capturing unit at the time of capturing the coding object image.

The adjustment unit may perform adjustment by allocating the larger target code amount to the first coding object image when the focus is changed and allocating the larger target code amount to the second coding object image when the change in focus is finished.

The adjustment unit may adjust the target code amount based on a state of movement of the capturing unit at the time of capturing the coding object image.

The adjustment unit may perform adjustment by allocating the larger target code amount to the first coding object image when the capturing unit moves at a speed having a predetermined threshold value or higher and allocating the larger target code amount to the second coding object image when the movement of the capturing unit at the speed having the predetermined threshold value or higher is finished.

The adjustment unit may adjust the target code amount based on a state of exposure of the capturing unit at the time of capturing the coding object image.

The adjustment unit may perform adjustment by allocating the larger target code amount to the first coding object image when the exposure is changed and allocating the larger target code amount to the second coding object image when the change in exposure is finished.

The coding device may further include a detection unit configured to detect the state of the capturing unit at the time of capturing the coding object image, in accordance with a user operation on the capturing unit, wherein the adjustment unit may adjust the target code amount based on the detected state of the capturing unit.

A coding method according to another embodiment of the present technology provides a coding method of a coding device that codes an image, which includes: adjusting, by the coding device, a target code amount that is a target of a code amount when coding a coding object image, based on a state of a capturing unit at the time of capturing the coding object image that is an object of coding; and coding, by the coding device, the coding object image in accordance with the adjusted target code amount.

A program according to still another embodiment of the present technology provides a program for causing a computer to serve as an adjustment unit configured to adjust a target code amount that is a target of a code amount when coding a coding object image, based on a state of a capturing unit at the time of capturing the coding object image that is an object of coding; and a coding unit configured to code the coding object image in accordance with the adjusted target code amount.

According to an embodiment of the present technology, a target code amount that is a target of a code amount when a coding object image is coded is adjusted based on a state of a capturing unit at the time of capturing the coding object image that is an object of coding, and the coding object image is coded in accordance with the adjusted target code amount.

According to the present technology, image degradation can be inhibited at the time of decoding regardless of the state of the capturing unit.

DETAILED DESCRIPTION OF THE EMBODIMENT(S)

Figure 1:
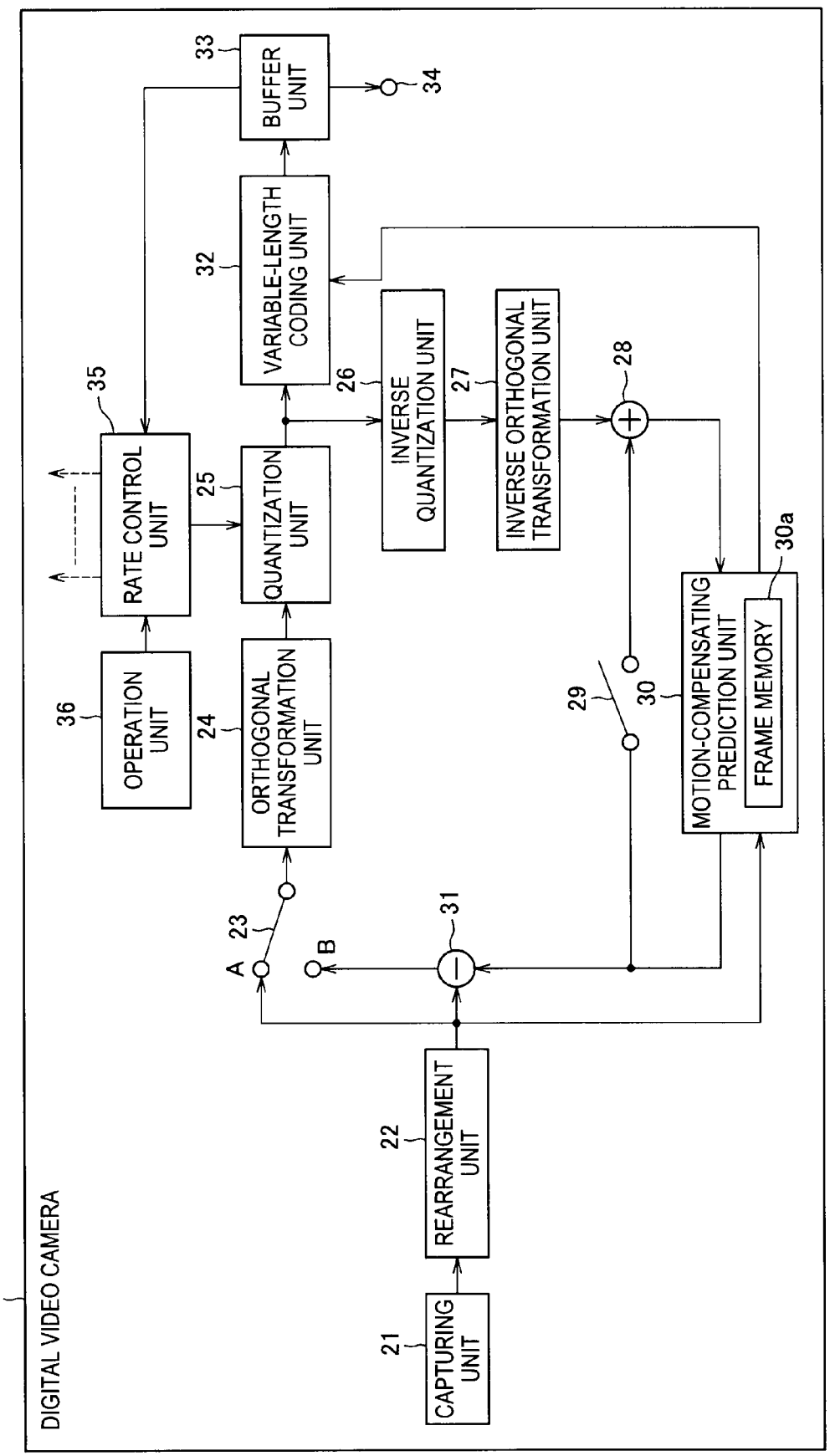
FIG. 1 is a block diagram illustrating a configuration example of a digital video camera in accordance with an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment in the present technology (hereinafter, referred to as a present embodiment) will be described. The description is made in the following order.

1. Present embodiment (an example of a case adjusting a target code amount that is allocated to each picture in accordance with a state of a capturing unit)
2. Modification

1. Present Embodiment

Configuration Example of Digital Video Camera 1

FIG. 1 is a block diagram illustrating a configuration example of a digital video camera 1 in accordance with a present embodiment.

The digital video camera 1 includes a capturing unit 21, a rearrangement unit 22, a changeover switch 23, an orthogonal transformation unit 24, a quantization unit 25, an inverse quantization unit 26, an inverse orthogonal transformation 27, an addition unit 28, a connection switch 29, a motion-compensating prediction unit 30 having a built-in frame memory 30a, a difference calculation unit 31, a variable-length coding unit 32, a buffer unit 33, an output terminal 34, a rate control unit 35, and an operation unit 36.

In addition, the digital video camera 1 can inhibit image degradation at the time of decoding by controlling a code amount of each image at the time of coding using a coding scheme such as an MPEG (hereinafter, also referred to as a compression coding) in accordance with a rapid zoom or the like at the time of capturing of the capturing unit 21.

In addition, in the digital video camera 1, besides the zoom or the like, it is possible to control the code amount of each image at the time of compression coding in accordance with a change in focus or exposure at the time of capturing, a movement of the capturing unit 21 (pan or tilt, hand blurring) and so forth. However, in the present embodiment, for ease of explanation, a case of controlling the code amount according to the zoom at the time of capturing will be described. Descriptions of the other cases will be described as a modified example.

The capturing unit 21 captures a subject, and supplies the frames (images) obtained by the capturing to the rearrangement unit 22.

The rearrangement unit 22 uses the frames supplied in a display order from the capturing 21 as pictures, and rearrange the frames in a picture order for compression in accordance with a group of picture (GOP) structure composed of, for example, 15 pictures.

The rearrangement unit 22 uses, each picture as the frame, as any one of an I picture, a P picture, and a B picture in accordance with the rearranged order. The rearrangement unit 22 then outputs each frame in a macroblock unit composed of, for example, 16×16 pixels.

Here, the I picture is a frame that is intra-coded without referring to other pictures. In addition, the P picture is a frame that is predictive-coded by referring to the I picture or the P picture displayed ahead in terms of time and using the prediction image generated (predicted) from the referred picture. In addition, the B picture is a frame that is prediction-coded by referring to the I or P picture displayed ahead in terms of time and one or both of the I and P pictures displayed later in terms of time and using the prediction image generated from the referred picture. In addition, the I and P pictures are referred to at the time of prediction coding other pictures, whereas the B picture is not referred to at the time prediction coding other pictures.

In particular, for example, the rearrangement unit 22 connects one end of the changeover switch 23 to the connection terminal A and does not connect the connection switch 29 to the connection terminal C at the time of outputting the I picture. The rearrangement unit 22 then divides the I picture into a plurality of macroblocks $I_{MB}$ and supplies the macroblocks to the orthogonal transformation unit 24 through the connection terminal A and the changeover switch 23.

In addition, for example, the rearrangement unit 22 connects the one end of the changeover switch 23 to the connection terminal B and connects the connection switch 29 to the connection terminal C at the time of outputting the P picture. The rearrangement unit 22 then divides the P picture into a plurality of macroblocks $P_{MB}$ and supplies the macroblocks to the motion-compensating prediction unit 30 and the difference calculation unit 31.

In a similar way, the rearrangement unit 22 connects the one end of the changeover switch 23 to the connection terminal B and connects the connection switch 29 to the connection terminal C at the time of outputting the B picture. The rearrangement unit 22 then divides the B picture into a plurality of macroblocks $B_{MB}$ and supplies the macroblocks to the motion-compensating prediction unit 30 and the difference calculation unit 31.

The one end of the changeover switch 23 can be connected to one of the connection terminal A and the connection terminal B, and is thus connected to the connection terminal A and the connection terminal B in accordance with control of the rearrangement unit 22. In addition, the other end of the changeover switch 23 is connected to the orthogonal transformation unit 24.

The orthogonal transformation unit 24 performs, for example, orthogonal transformation such as discrete cosine transformation (DCT) on the macroblocks $I_{MB}$ supplied through the connection terminal A and the changeover switch 23 from the rearrangement unit 22, and supplies the obtained transformation coefficients $f(I_{MB})$ to the quantization unit 25.

In addition, in the orthogonal transformation unit 24, for example, the macroblock $I_{MB}$ of 16×16 pixels is divided into blocks each composed of 8×8 pixels, and orthogonal transformation is performed on each of the divided blocks. In addition, the orthogonal transformation is not limited to the DCT but may employ, for example, a karhunen-loeve (K-L) transformation or a discrete wavelet transformation, and so forth.

In addition, the orthogonal transformation unit 24 performs orthogonal transformation on the prediction residual $P_{MBD}$ supplied through the connection terminal B and the changeover switch 23 from the difference calculation unit 31, and supplies the obtained transformation coefficients $f(P_{MBD})$ to the quantization unit 25.

In addition, the prediction residual $P_{MBD}$ indicates a difference ($P_{MB}-P_{MB}'$) between the macroblock $P_{MB}$ and the prediction macroblock $P_{MB}'$ obtained by predicting the macroblock $P_{MB}$ with motion compensation performed by the motion-compensating prediction unit 30.

In addition, the orthogonal transformation unit 24 performs orthogonal transformation on the prediction residual $B_{MBD}$ supplied through the connection terminal B and the changeover switch 23 from the difference calculation unit 31, and supplies the obtained transformation coefficients $f(B_{MBD})$ to the quantization unit 25.

In addition, the prediction residual $B_{MBD}$ indicates a difference ($B_{MB}-B_{MB}'$) between the macroblock $B_{MB}$ and the prediction macroblock $B_{MB}'$ obtained by predicting the macroblock $B_{MB}$ with motion compensation performed by the motion-compensating prediction unit 30.

The quantization unit 25 quantizes the transformation coefficients $f(I_{MB})$ from the orthogonal transformation unit 24 based on a quantization scale from the rate control unit 35, and supplies the obtained quantization transformation coefficients $F(I_{MB})$ to the inverse quantization unit 26 and the variable-length coding unit 32.

In addition, the quantization unit 25 quantizes the transformation coefficients $f(P_{MBD})$ from the orthogonal transformation unit 24 based on a quantization scale from the rate control unit 35, and supplies the obtained quantization transformation coefficients $F(P_{MBD})$ to the inverse quantization unit 26 and the variable-length coding unit 32.

In addition, the quantization unit 25 quantizes the transformation coefficients $f(B_{MBD})$ from the orthogonal transformation unit 24 based on a quantization scale from the rate control unit 35, and supplies the obtained quantization transformation coefficients $F(B_{MBD})$ to the variable-length coding unit 32.

The inverse quantization unit 26 inverse-quantizes the quantization transformation coefficients $F(I_{MB})$ from the quantization unit 25, and supplies the obtained transformation coefficients $f(I_{MB})$ to the inverse orthogonal transformation unit 27. In addition, the inverse quantization unit 26 inverse-quantizes the quantization transformation coefficients $F(P_{MBD})$ from the quantization unit 25, and supplies the obtained transformation coefficients $f(P_{MB})$ to the inverse orthogonal transformation unit 27.

The inverse orthogonal transformation unit 27 performs inverse orthogonal transformation on the transformation coefficients $f(I_{MB})$ from the inverse quantization unit 26, and supplies the obtained macroblock $I_{MB}$ to the motion-compensating prediction unit 30 through the addition unit 28.

The inverse orthogonal transformation unit 27 performs inverse orthogonal transformation on the transformation coefficients $f(P_{MBD})$ from the inverse quantization unit 26, and supplies the obtained prediction residual $P_{MBD}$ to the addition unit 28.

The addition unit 28 supplies the macroblock $I_{MB}$ from the inverse orthogonal transformation unit 27 to the motion-compensating prediction unit 30 as it is.

In addition, the addition unit 28 add the prediction residual $P_{MBD}$ ($=P_{MB}-P_{MB}'$) from the inverse orthogonal transformation unit 27 and the prediction macroblock $P_{MB}'$ supplied through the connection switch 29 from the motion-compensating prediction unit 30. The addition unit 28 then supplies the macroblock $P_{MB}$ obtained by the addition to the motion-compensating prediction unit 30.

One end of the connection switch 29 is connected to the addition unit 28 through the connection terminal C in accordance with control of the rearrangement unit 22.

The motion-compensating prediction unit 30 has the built-in frame memory 30a, and retains the macroblocks $I_{MB}$ and $P_{MB}$ from the addition unit 28 in the built-in frame memory 30a as reference macroblocks that are referred to for generating the prediction macroblock $P_{MB}'$ or $B_{MB}'$.

In addition, for example, the motion-compensating prediction unit 30 detects the motion vector $P_{MV}$ indicating the motion of the macroblock $P_{MB}$ from the rearrangement unit 22 based on the reference macroblock $I_{MB}$ retained in the frame memory 30a, and supplies the detected motion vector to the variable-length coding unit 32.

In addition, for example, the motion-compensating prediction unit 30 motion-compensates the macroblock $P_{MB}$ based on the detected motion vector $P_{MV}$ and the reference macroblock $I_{MB}$ retained in the frame memory 30a. The motion-compensating prediction unit 30 supplies the prediction macroblock $P_{MB}'$ obtained by the motion compensation to the connection switch 29 and the difference calculation unit 31.

In addition, for example, the motion-compensating prediction unit 30 detects the motion vector $B_{MV}$ indicating the motion of the macroblock $B_{MB}$ from the rearrangement unit 22 based on the reference macroblock $I_{MB}$ or the reference macroblock $P_{MB}$ retained in the frame memory 30a, and supplies the detected motion vector to the variable-length coding unit 32.

The motion-compensating prediction unit 30 then motion-compensates the macroblock $B_{MB}$ based on the detected motion vector $B_{MV}$ and the reference macroblock $I_{MB}$ or the reference macroblock $P_{MB}$ retained in the frame memory 30a. The motion-compensating prediction unit 30 supplies the prediction macroblock $B_{MB}'$ obtained by the motion compensation to the difference calculation unit 31.

The difference calculation unit 31 calculates a prediction residual $P_{MBD}$ ($=P_{MB}-P_{MB}'$) indicating a difference between the macroblock $P_{MB}$ from the rearrangement unit 22 and the prediction macroblock $P_{MB}'$ from the motion-compensating prediction unit 30, and supplies the prediction residual to the orthogonal transformation unit 24 through the output terminal B and the changeover switch 23.

In addition, difference calculation unit 31 calculates a prediction residual $B_{MBD}$ ($=B_{MB}-B_{MB}'$) indicating a difference between the macroblock $B_{MB}$ from the rearrangement unit 22 and the prediction macroblock $B_{MB}'$ from the motion-compensating prediction unit 30, and supplies the prediction residual to the orthogonal transformation unit 24 through the output terminal B and the changeover switch 23.

The variable-length coding unit 32 performs variable-length coding on the quantization transformation coefficients $F(I_{MB})$ from the quantization unit 25, and supplies the obtained codes EN(I) to the buffer unit 33 and causes the buffer unit to retain the obtained codes.

In addition, the variable-length coding unit 32 performs variable-length coding on the quantization transformation coefficients $F(P_{MBD})$ from the quantization unit 25 and the motion vector $P_{MV}$ from the motion-compensating prediction unit 30, and supplies the obtained codes EN(P) to the buffer unit 33 and causes the buffer unit to retain the obtained codes.

In addition, the variable-length coding unit 32 performs variable-length coding on the quantization transformation coefficients $F(B_{MBD})$ from the quantization unit 25 and the motion vector $B_{MV}$ from the motion-compensating prediction unit 30, and supplies the obtained codes EN(B) to the buffer unit 33 and causes the buffer unit to retain the obtained codes.

The buffer unit 33 temporarily retains the codes from the variable-length coding unit 32, and supplies the codes to the output terminal 34.

In addition, the buffer unit 33 calculates the generated code amount Si indicating a code amount of the codes EN(I) based on the codes EN(I) from the variable-length coding unit 32, and supplies the generated code amount to the rate control unit 35.

In a similar way, the buffer unit 33 calculates the generated code amount Sp indicating a code amount of the codes EN(P) based on the codes EN(P) from the variable-length coding unit 32, and supplies the generated code amount to the rate control unit 35. In addition, the buffer unit 33 calculates the generated code amount Sb indicating a code amount of the codes EN(B) based on the codes EN(B) from the variable-length coding unit 32, and supplies the generated code amount to the rate control unit 35.

The output terminal 34 is a terminal that outputs the codes retained in the buffer unit 33 to, for example, a hard disc or the like not shown as the coding result of the MPEG compression coding.

The rate control unit 35, for example, controls the coding rate of 1 GOP using a code amount control algorithm of TM5. In particular, for example, the rate control unit 35 calculates a quantization scale of each picture in 1 GOP, and supplies the calculated quantization scale to the quantization unit 25.

Generated code amounts Si, Sp, and Sb supplied to the rate control unit 35 from the buffer unit 33 and average quantization scales Qi, Qp, and Qb calculated in the rate control unit 35 are employed for the rate control using the code amount control algorithm of TM5.

In addition, details of TM5 will be described later. TM5 is also disclosed in Patent Document 1 or 'http://www.mpeg.org/MPEG/MSSG/tm5/Ch10/Ch10.html,' and so forth.

In addition, the rate control unit 35 detects the state of the capturing unit 21 (e.g., whether the rapid zoom is carried out in the capturing unit 21, and so forth) in accordance with an operation signal from the operation unit 36.

The rate control unit 35 then adjusts a target code amount indicating the generated code amount that is a target at the time of compression coding each picture by changing parameters (R, Kb, or Kp that will be described later) used for the code amount control algorithm based on the detected state of the capturing unit 21.

That is, for example, when the rate control unit 35 detects that the rapid zoom or the like is not carried out in the capturing unit 21 as the state of the capturing unit 21, the rate control unit determines that the prediction residual of the frame (picture) obtained by capturing of the capturing unit 21 is not increased.

Figure 2:
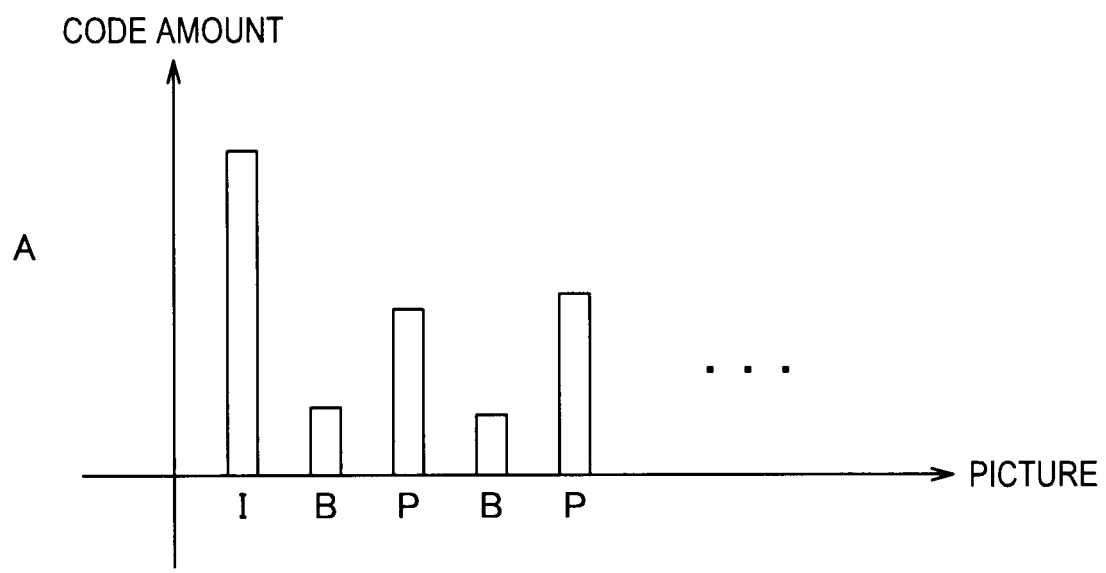
FIG. 2 is a diagram illustrating an example of adjusting a target code amount that is allocated to each picture in accordance with a state of a capturing unit.
Figure 2:
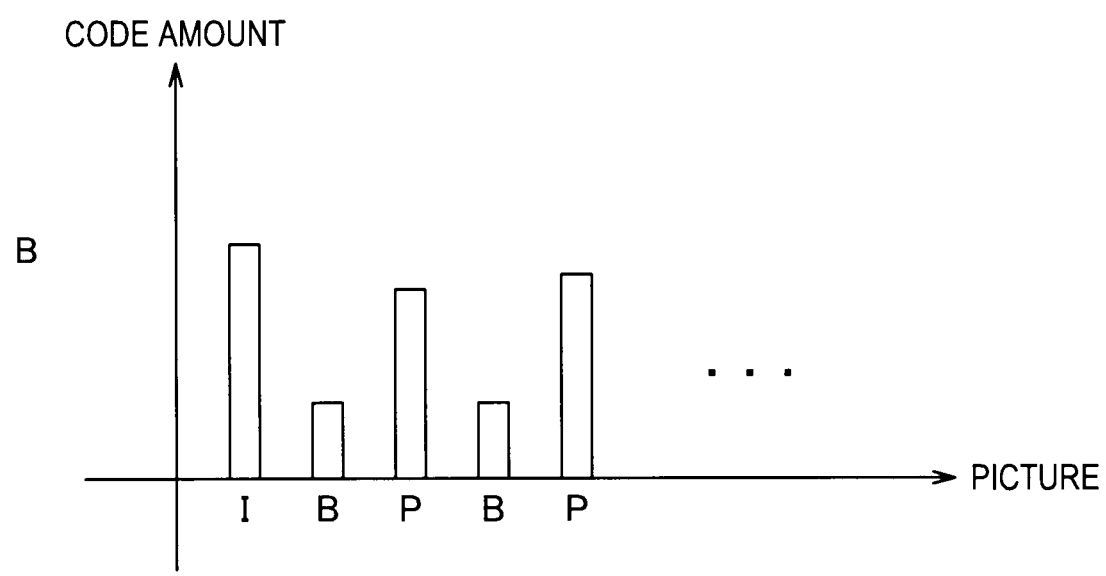

When the rate control unit 35 determines that the prediction residual is not increased, the rate control unit changes parameters used to calculate the target code amounts Ti, Tp, and Tb such that the target code amount Ti of the I picture and the target code amount Tp of the P picture are increased and the target code amount Tb of the B picture is decreased as shown in FIG. 2A.

Here, the target code amount Ti indicates the generated code amount Si that is a target at the time of compression coding the I picture included in 1 GOP. In addition, the target code amount Tp indicates the generated code amount Sp that is a target at the time of compression coding the P pictures included in 1 GOP. In addition, the target code amount Tb indicates the generated code amount Sb that is a target at the time of coding the B pictures included in 1 GOP.

In addition, for example, when the rate control unit 35 detects that the rapid zoom or the like is carried out in the capturing unit 21 as the state of the capturing unit 21, the rate control unit determines that the prediction residual is increased.

When the rate control unit 35 determines that the prediction residual is increased, the rate control unit changes parameters such that the target code amount Ti of the I picture is decreased and the target code amount Tp of the P picture and the target code amount Tb of the B picture are increased as shown in FIG. 2B.

In addition, the target code amount Ti shown in FIG. 2B is, for example, about 0.7 times the target code amount Ti shown in FIG. 2A, the target code amount Tp shown in FIG. 2B is, for example, about 1.1 times the target code amount Tp shown in FIG. 2A, and the target code amount Tb shown in FIG. 2B is, for example, about 1.2 times the target code amount Tb shown in FIG. 2A.

The rate control unit 35 performs the code amount control algorithm using the changed parameters in the code amount control algorithm when the parameters are changed.

That is, for example, the rate control unit 35 calculates the target code amounts Ti, Tp, and Tb in 1 GOP using the parameters described above by use of the first step in TM5.

In the second and third steps of TM5, the rate control unit 35 then determines the quantization scale mquantj per each macroblock of the coding object picture based on the target code amounts Ti, Tp, and Tb calculated in the first step, and supplies the determined quantization scale to the quantization unit 25.

That is, the rate control unit 35 controls the coding rate by causing the quantization unit 25 to perform quantization using the quantization scales mquantj by which the I, P, and B pictures per 1 GOP are compression coded to the respective target code amounts Ti, Tp, and Tb calculated in the first step.

The operation unit 36 includes buttons and so forth that are operated when the zoom or the like of the capturing unit 21 is carried out, and is operated by a user. The operation unit 36, for example, supplies the corresponding operation signal to the rate control unit 35 in accordance with the operation of the user.

[Details of First Step to Third Step in Tm5]

Next, details of TM5 will be described. TM5 is carried out by the first step to the third step below.

(First step) a step of determining the target code amount Ti allocated to the I picture per 1 GOP, the target code amount Tp allocated to the P picture per 1 GOP, and the target code amount Tb allocated to the B picture per 1 GOP in 1 GOP (Second step) a step of determining an expedient quantization scale Qj in the $j^{th}$ macroblock of the coding object picture based on the target code amounts Ti, Tp, and Tb determined in the first step (Third step) a step of determining a final quantization scale mquantj based on the expedient quantization scale Qj determined in the second step The rate control unit 35 updates the global complexity measure Xi at the time of compression coding the I picture, the global complexity measure Xp at the time of compression coding the P picture, and the global complexity measure Xb at the time of compression coding the B picture whenever compression coding of I picture is performed in the first step.

In addition, initial values of the global complexity measures Xi, Xp, and Xb are calculated as in Equations (1) to (3) below, respectively.

$$Xi=(160\times bit\_rate)/115 \quad (1)$$

$$Xp=(60\times bit\_rate)/115 \quad (2)$$

$$Xb=(42\times bit\_rate)/115 \quad (3)$$

Here, bit_rate (bit/s) is determined in advance in accordance with a capturing mode of the capturing unit 21, a writing rate at the time of writing codes output from the output terminal 34 in a hard disc, or the like, and indicates the coding rate of codes that are output from the variable-length coding unit 32.

That is, for example, the rate control unit 35 updates the global complexity measure Xi by means of Equation (4) below whenever compression coding of the I picture is carried out in the first step. Here, the generated code amount Si indicates the code amount of the codes EN(I) generated by compression coding of the I picture. In addition, the average quantization scale Qi indicates the average of the quantization scales used at the time of quantizing the respective macroblocks $I_{MB}$ constituting the I picture.

$$Xi=Si\times Qi \quad (4)$$

In addition, for example, the rate control unit 35 updates the global complexity measure Xp by means of Equation (5) below whenever compression coding of the P picture is carried out in the first step. Here, the generated code amount Sp indicates the code amount of the codes EN(P) generated by the compression coding of the P picture. In addition, the average quantization scale Qp indicates the average of the quantization scales used at the time of quantizing the prediction residuals $P_{MBD}$ of the respective macroblocks constituting the P picture.

$$Xp=Sp\times Qp \quad (5)$$

In addition, for example, the rate control unit 35 updates the global complexity measure Xb by means of Equation (6) below whenever the compression coding of the B picture is carried out in the first step. Here, the generated code amount Sb indicates the code amount of the codes EN(B) generated by the compression coding of the B picture. In addition, the average quantization scale Qb indicates the average of the quantization scales used at the time of quantizing the prediction residuals $B_{MBD}$ of the respective macroblocks constituting the B picture.

$$Xb=Sb\times Qb \quad (6)$$

In addition, the rate control unit 35 updates a GOP target code amount R indicating the code amount that is a target at the time of compression coding 1 GOP whenever one picture is compression coded in the first step. In addition, the GOP target code amount R is represented as in Equation (7) below.

$$R=G+R_{pre} \quad (7)$$

Here, the initial target code amount G is represented, for example, as G=N×bit_rate/picture_rate when 1 GOP is composed of N pictures. In addition, the GOP target code amount $R_{pre}$ indicates the leftover (remainder) of the GOP target code amount R in 1 GOP of the previous time. In addition, the initial value of the GOP target code amount $R_{pre}$ is 0. In addition, the picture rate picture_rate(pic/s) is determined in advance in accordance with the capturing mode of the capturing unit 21 or the writing rate at the time of writing the code output from the output terminal 34, and so forth in a hard disc, and indicates the picture rate of each picture corresponding to the code output from the variable-length coding unit 32.

That is, for example, the rate control unit 35 subtracts the generated code amount Si of the codes EN(I) obtained by compression coding the I picture from the GOP target code amount R whenever compression coding of the I picture is carried out and thus updates the GOP target code amount R in the first step.

In addition, for example, the rate control unit 35 subtracts the generated code amount Sp of the codes EN(P) obtained by compression coding the P picture from the GOP target code amount R whenever compression coding of the P picture is carried out and thus updates the GOP target code amount R in the first step.

In addition, for example, the rate control unit 35 subtracts the generated code amount Sb of the codes EN(B) obtained by compression coding the B picture from the GOP target code amount R whenever compression coding of the B picture is carried out and thus updates the GOP target code amount R in the first step.

The rate control unit 35 then updates the global complexity measures Xi, Xp, and Xb and the GOP target code amount R, and calculates the target code amount Ti by means of Equation (8) below in the first step.

$$Ti=\max\{R/(1+((Np\times Xp)/(Xi\times Xp))+((Nb\times Xb)/(Xi\times Kb))), bit\_rate/(8\times picture\_rate)\} \quad (8)$$

In addition, the number of remainder Np indicates the number of remainder of the P pictures that are not yet compression coded in 1 GOP. In addition, the number of remainder Nb indicates the number of remaining B pictures that are not yet compression coded in 1 GOP. In addition, the constant Kb is, for example, 1.4.

In a similar way, the rate control unit 35 updates the global complexity measures Xi, Xp, and Xb and the GOP target code amount R, and then calculates the target code amount Tp and the target code amount Tb by means of Equations (9) and (10) below in the first step. In addition, the constant Kp is, for example, 1.0.

$$Tp=\max\{R/(Np+((Nb\times Kp\times Xb)/(Kb\times Xp))), bit\_rate/(8\times picture\_rate)\} \quad (9)$$

$$Tb=\max\{R/(Nb+((Np\times Kb\times Xp)/(Kp\times Xb))), bit\_rate/(8\times picture\_rate)\} \quad (10)$$

Thereby, the first step in the rate control unit 35 is thus finished.

The rate control unit 35 calculates the expedient quantization scale Qj in the $j^{th}$ macroblock $I_{MB}$ by means of Equation (11) below in the second step.

$$Qj=(dj\times 31/r) \quad (11)$$

Here, r=2×bit_rate/picture_rate, dj=$do^i$+$B_{j-1}$−(Ti×(j−1)/MB_cnt), and $do^i$=10×r/31. In addition, MB_cnt indicates the total number of macroblocks in 1 picture. In addition, for example, the generated code amount Bj−1 indicates the code amount generated in up to the (j−1)$^{th}$ macroblocks $I_{MB}$ in a raster scan order.

In addition, in a similar way, the rate control unit 35 calculates the quantization scale Qj by means of Equation (11) in a case of calculating the expedient quantization scale Qj in the $j^{th}$ macroblock $P_{MB}$ in the second step. In this case, $dj=do^p+B_{j-1}-(Tp\times(j-1)/MB\_cnt)$, and $do^p=Kp\times do^i$.

In addition, in a similar way, the rate control unit 35 calculates the quantization scale Qj by means of Equation (11) in a case of calculating the expedient quantization scale Qj in the $j^{th}$ macroblock $B_{MB}$ in the second step. In this case, $dj=do^b+B_{j-1}-(Tb\times(j-1)/MB\_cnt)$, and $do^b=Kb\times do^i$.

Thereby, the second step in the rate control unit 35 is thus finished.

After the second step is finished, the rate control unit 35 calculates the spatial activity actj indicating the complexity of the image in the $j^{th}$ macroblock $I_{MB}$ per macroblock $I_{MB}$ by means of Equation (12) below in the third step.

$$\text{act}j=1+\min(vblk_1, vblk_2, \ldots, vblk_8) \quad (12)$$

Here, $vblnk_n$ is represented by Equation (13) below.

$$vblnk_n=(1/64)\times\Sigma^{64}_{k=1}(P^n_k P\_\text{mean}_k)^2 \quad (13)$$

In addition, $P\_\text{mean}_k$ is represented by Equation (14) below.

$$P\_\text{mean}_k=(1/64)\times\Sigma^{64}_{k=1}P^n_k \quad (14)$$

In addition, $P^n_k$ indicates a pixel value of the $k^{th}$ pixel among pixels of the $n^{th}$ block of 8×8 pixels in the macroblock $I_{MB}$.

In addition, the rate control unit 35 normalizes the spatial activity actj by means of Equation (15), and calculates the normalized spatial activity N_actj in the third step.

$$N\_\text{act}j=\{(2\times\text{act}j)+\text{avg\_act}\}/\{\text{act}j+(2\times\text{avg\_act})\} \quad (15)$$

Here, avg_act indicates the average of the spatial activities actj of the respective macroblocks constituting the picture that was just previously compression coded (in this case, for example, the picture compression coded just prior to the I picture composed of macroblocks $I_{MB}$). In addition, when the compression coded picture is not yet present, avg_act becomes, for example, 400.

The rate control unit 35 then calculates the quantization scale mquantj used at the time of quantizing the $j^{th}$ macroblock $I_{MB}$ by means of Equation (16) below in the third step.

$$\text{mquant}j=Qj\times N\_\text{act}j \quad (16)$$

In addition, in a similar way, the rate control unit 35 calculates the quantization scale used at the time of quantizing the prediction residual $P_{MBD}$ corresponding to the $j^{th}$ macroblock $P_{MB}$ and the quantization scale used at the time of quantizing the prediction residual $B_{MBD}$ corresponding to the $j^{th}$ macroblock $B_{MB}$ in the third step.

[Description of Operation of Digital Video Camera 1]

Next, the compression coding process carried out by the digital video camera 1 will be described with reference to the flow chart of FIG. 3.

The compression coding process, for example, is initiated when the user performs the operation for initiating capturing of the capturing unit 21 using the operation unit 36.

In step S1, the capturing unit 21 captures the object, and supplies the frames (images) obtained by the capturing to the rearrangement unit 22.

In step S2, the rearrangement unit 22 rearranges the pictures as the frames that are supplied in a display order from the capturing unit 21 in a picture order for compression in accordance with the GOP structure.

In step S3, the rearrangement unit 22 sequentially uses each picture as a picture of interest in accordance with the rearranged picture order.

In step S4, the rate control unit 35 performs a rate control process of calculating the quantization scales of the respective macroblocks constituting the picture of interest, and supplies the obtained quantization scales to the quantization unit 25. In addition, details of the rate control process will be described with reference to the flow chart of FIG. 4.

In step S5, the rearrangement unit 22 determines whether or not the picture of interest is the I picture in accordance with the rearranged picture order, and the process proceeds to step S6 when it is determined that the picture of interest is the I picture.

In step S6, the rearrangement unit 22 connects one end of the changeover switch 23 to the connection terminal A, and does not connect the connection switch 29 to the connection terminal C. The rearrangement unit 22 then divides the I picture as the picture of interest into a plurality of macroblocks $I_{MB}$, and supplies the macroblocks to the orthogonal transformation unit 24 through the connection terminal A and the changeover switch 23.

In step S7, the orthogonal transformation unit 24 performs orthogonal transformation such as DCT or the like on the macroblocks $I_{MB}$ supplied through the connection terminal A and the changeover switch 23 from the rearrangement unit 22, and supplies the obtained transformation coefficients $f(I_{MB})$ to the quantization unit 25.

In addition, when the picture of interest is the P picture, the orthogonal transformation unit 24 performs orthogonal transformation on the prediction residual $P_{MBD}$ supplied through the connection terminal B from the difference calculation unit 31, and supplies the obtained transformation coefficients $f(P_{MBD})$ to the quantization unit 25. In addition, when the picture of interest is the B picture, the orthogonal transformation unit 24 performs orthogonal transformation on the prediction residual $B_{MBD}$ supplied through the connection terminal B from the difference calculation unit 31, and supplies the obtained transformation coefficients $f(B_{MBD})$ to the quantization unit 25.

In step S8, the quantization unit 25 quantizes the transformation coefficients $f(I_{MB})$ from the orthogonal transformation unit 24 based on the quantization scale corresponding to the macroblock $I_{MB}$ from the rate control unit 35. The quantization unit 25 then supplies the obtained the quantization transformation coefficients $F(I_{MB})$ to the inverse quantization unit 26 and the variable-length coding unit 32.

In addition, the quantization unit 25 quantizes the transformation coefficients $f(P_{MB})$ from the orthogonal transformation unit 24 based on the quantization scale corresponding to (the prediction residual $P_{MBD}$ of) the macroblock $P_{MB}$ from the rate control unit 35 when the picture of interest is the P picture. The quantization unit 25 then supplies the obtained quantization transformation coefficients $F(P_{MB})$ to the inverse quantization unit 26 and the variable-length coding unit 32.

In addition, the quantization unit 25 quantizes the transformation coefficients $f(B_{MB})$ from the orthogonal transformation unit 24 based on the quantization scale corresponding to (the prediction residual $B_{MBD}$ of) the macroblock $B_{MB}$ from the rate control unit 35 when the picture of interest is the B picture. The quantization unit 25 then supplies the obtained quantization transformation coefficients $F(B_{MB})$ to the variable-length coding unit 32.

In step S9, the variable-length coding unit 32 performs variable-length coding on the quantization transformation coefficients $F(I_{MB})$ from the quantization unit 25, and supplies the obtained codes EN(I) to the buffer unit 33 and causes the buffer unit to retain the obtained codes.

In addition, when the picture of interest is the P picture, the variable-length coding unit 32 performs variable-length coding on the quantization transformation coefficients $F(P_{MB})$ from the quantization unit 25 and the motion vector $P_{MV}$ from the motion-compensating prediction unit 30, and supplies the obtained codes EN(P) to the buffer unit 33 and causes the buffer unit to retain the obtained code. In addition, when the picture of interest is the B picture, the variable-length coding unit 32 performs variable-length coding on the quantization transformation coefficients $F(B_{MB})$ from the quantization unit 25 and the motion vector $B_{MV}$ from the motion-compensating prediction unit 30, and supplies the obtained codes EN(B) to the buffer unit 33 and causes the buffer unit to retain the obtained code.

In step S10, the buffer unit 33 calculates the generated code amount Si of the codes EN(I) based on the codes EN(I) from the variable-length coding unit 32, and supplies the generated code amount to the rate control unit 35.

In addition, when the picture of interest is the P picture, the buffer unit 33 calculates the generated code amount Sp of the codes EN(P) based on the codes EN(P) from the variable-length coding unit 32, and supplies the generated code amount to the rate control unit 35. In addition, when the picture of interest is the B picture, the buffer unit 33 calculates the generated code amount Sb of the codes EN(B) based on the codes EN(B) from the variable-length coding unit 32, and supplies the generated code amount to the rate control unit 35.

In step S11, the inverse quantization unit 26 performs inverse quantization an the quantization transformation coefficients $F(I_{MB})$ from the quantization unit 25, and supplies the obtained transformation coefficients $f(I_{MB})$ to the inverse orthogonal transformation unit 27.

In addition, when the picture of interest is the P picture, the inverse quantization unit 26 performs inverse quantization on the quantization transformation coefficients $F(P_{MB})$ from the quantization unit 25, and supplies the obtained transformation coefficients $f(P_{MB})$ to the inverse orthogonal transformation unit 27. In addition, when the picture of interest is the B picture, processes of step S11 to step S13 are skipped.

In step S12, the inverse orthogonal transformation unit 27 performs inverse orthogonal transformation on the transformation coefficients $f(I_{MB})$ from the inverse quantization 26, and supplies the obtained macroblock $I_{MB}$ to the motion-compensating prediction unit 30 through the addition unit 28.

In addition, when the picture of interest is the P picture, the inverse orthogonal transformation unit 27 performs inverse orthogonal transformation on the transformation coefficients $f(P_{MB})$ from the inverse quantization unit 26, and supplies the prediction residual $P_{MBD}$ of the obtained macroblock $P_{MB}$ to the addition unit 28.

The addition unit 28 adds corresponding pixel values between the prediction residual $P_{MBD}$ (=$P_{MB}-P_{MB}'$) from the inverse orthogonal transformation unit 27 and the prediction macroblock $P_{MB}'$ supplied through the connection switch 29 from the motion-compensating prediction unit 30. The addition unit 28 then supplies the macroblock $P_{MB}$ obtained by the addition to the motion-compensating prediction unit 30.

In step S13, the motion-compensating prediction unit 30 retains the macroblock $I_{MB}$ supplied through the addition unit 28 from the inverse orthogonal transformation unit 27 as the reference macroblock referred to for generating the prediction macroblock $P_{MB}'$ or $B_{MB}'$ in the built-in frame memory 30a.

In addition, when the picture of interest is the P picture, the motion-compensating prediction unit 30 retains the macroblock $P_{MB}$ supplied from the addition unit 28 as the reference macroblock referred to for generating the prediction macroblock $B_{MB}'$ in the built-in frame memory 30a.

In step S14, the rearrangement unit 22 determines whether or not each and every picture constituting 1 GOP was used as the picture of interest, and returns to step S3 when the rearrangement unit determines that all of the pictures constituting 1 GOP was not used as the picture of interest.

In step S3, the rearrangement unit 22 uses the picture that is not yet used as the picture of interest among the pictures constituting 1 GOP as a new picture of interest, and the process proceeds to step S4.

In step S4, besides the operation signal from the operation unit 36, the rate control unit 35 performs the rate control process based on the generated code amount Si or the like supplied from the buffer unit 33 by means of the immediately previous process of step S10, and the same processes are carried out from step S5.

In addition, in step S14, when the rearrangement unit 22 determines that every picture constituting 1 GOP was used as the picture of interest, the rearrangement unit returns to step S2, and the same processes are carried out from then on.

In addition, in step S5, when the rearrangement unit 22 determines that the picture of interest is not the I picture, the process proceeds to step S15.

In step S15, for example, when the rearrangement unit 22 determines that the picture of interest is the P picture, the rearrangement unit 22 connects one end of the changeover switch 23 to the connection terminal B, and connects the connection switch 29 to the connection terminal C.

The rearrangement unit 22 then divides the P picture as the picture of interest into a plurality of macroblocks $P_{MB}$, and supplies the divided macroblocks to the motion-compensating prediction unit 30 and the difference calculation unit 31.

In step S16, the motion-compensating prediction unit 30 detects the motion vector $P_{MV}$ indicating the motion of the macroblock $P_{MB}$ from the rearrangement unit 22 based on the reference macroblock $I_{MB}$ retained in the frame memory 30a, and supplies the detected motion vector to the variable-length coding unit 32.

In addition, for example, the motion-compensating prediction unit 30 motion-compensates the macroblock $P_{MB}$ based on the detected motion vector $P_{MV}$ and the reference macroblock $I_{MB}$ retained in the frame memory 30a. The motion-compensating prediction unit 30 then supplies the obtained prediction macroblock $P_{MB}'$ to the connection switch 29 and the difference calculation unit 31.

In step S17, the difference calculation unit 31 calculates the prediction residual $P_{MBD}$ (=$P_{MB}-P_{MB}'$) indicating the difference between the macroblock $P_{MB}$ from the rearrangement unit 22 and the prediction macroblock $P_{MB}'$ from the motion-compensating prediction unit 30, and supplies the prediction residual to the orthogonal transformation unit 24 through the output terminal B and the changeover switch 23, and the process proceeds to step S7.

In step S7, the orthogonal transformation unit 24 performs orthogonal transformation on the prediction residual $P_{MBD}$ supplied through the connection terminal B and the changeover switch 23 from the difference calculation unit 31, and supplies the obtained transformation coefficients $f(P_{MBD})$ to the quantization unit 25, and the same processes are carried out from then on.

In addition, step S15, for example, when the rearrangement unit 22 determines that the picture of interest is the B picture, the rearrangement unit connects one end of the changeover switch 23 to the connection terminal B and connects the connection switch 29 to the connection terminal C.

The rearrangement unit 22 then divides the B picture as the picture of interest into a plurality of macroblocks $B_{MB}$, and supplies the divided macroblocks to the motion-compensating prediction unit 30 and the difference calculation unit 31.

In step S16, the motion-compensating prediction unit 30 detects the motion vector $B_{MV}$ indicating the motion of the macroblock $B_{MB}$ from the rearrangement unit 22 based on the reference macroblock $I_{MB}$ or the reference macroblock $P_{MB}$ retained in the frame memory 30a, and supplies the detected motion vector to the variable-length coding unit 32.

In addition, for example, the motion-compensating prediction unit 30 motion-compensates the macroblock $B_{MB}$ based on the detected motion vector $B_{MV}$ and the reference macroblock $I_{MB}$ or the reference macroblock $P_{MB}$ retained in the frame memory 30a. The motion-compensating prediction unit 30 then supplies the obtained prediction macroblock $B_{MB}'$ to the difference calculation unit 31.

In step S17, the difference calculation unit 31 calculates the prediction residual $B_{MBD}$ ($=B_{MB}-B_{MB}'$) indicating the difference between the macroblock $B_{MB}$ from the rearrangement unit 22 and the prediction macroblock $B_{MB}'$ from the motion-compensating prediction unit 30, and supplies the prediction residual to the orthogonal transformation unit 24 through the output terminal B and the changeover switch 23, and the process proceeds to step S7.

In step S7, the orthogonal transformation unit 24 performs orthogonal transformation on the prediction residual $B_{MBD}$ supplied through the connection terminal B and the changeover switch 23 from the difference calculation unit 31, and supplies the obtained transformation coefficients $f(B_{MBD})$ to the quantization unit 25, and the same processes are carried out from then on.

In addition, the compression coding process is finished, for example, when the user carries out the operation for stopping capturing of the capturing unit 21 using the operation unit 36.

[Details of Rate Control Process]

Next, details of the rate control process in step S4 of FIG. 3 will be described with reference to the flow chart of FIG. 4.

In step S31, the rate control unit 35 detects the state of the capturing unit 21 at the time of capturing the picture of interest based on the operation signal from the operation unit 36.

That is, for example, when the user carries out the zoom operation causing the capturing unit 21 to perform the zoom using the operation unit 36, the operation unit 36 supplies the operation signal corresponding to the zoom operation of the user to the rate control unit 35.

The rate control unit 35 then detects the zoom state of the capturing unit 21 (e.g., how fast the zoom is carried out, and so forth) at the time of capturing the picture of interest based on the operation signal from the operation unit 36.

In addition, when the operation signal is not supplied from the operation unit 36, the rate control unit 35 detects the state of the capturing unit 21, for example, as the state that the zoom or the like is not carried out in the capturing unit 21 at the time of capturing the picture of interest.

In step S31, the rate control unit 35 detects the state of the capturing unit 21 based on the operation signal from the operation unit 36, however, the method of detecting the state of the capturing unit 21 is not limited thereto. That is, for example, the capturing unit 21 may generate the information at the time of capturing indicating capturing of the picture of interest and supply the information at the time of capturing to the rate control unit 35, and the rate control unit 35 may detect the state of the capturing unit 21 based on the information at the time of capturing from the capturing unit 21.

In step S32, the rate control unit 35 determines whether or not the rapid zoom performed at a speed equal to or higher than a predetermined threshold value th1 is initiated based on the detected state of zoom.

When the rate control unit 35 determines that the rapid zoom is initiated based on the detected state of zoom, the process proceeds to step S33.

In step S33, the rate control unit 35 performs adjustment such that the target code amounts Tp and Tb of the respective P and B pictures that are compression coded with reference to (the reference macroblocks constituting) the reference frame are increased by changing at least one of current parameters R, Kb, and Kp.

In step S34, the rate control unit 35 then calculates the target code amount T of the picture of interest by the first step in TM5 using the changed parameters R, Kb, and Kp in step S33. That is, for example, when the picture of interest is the I picture, the rate control unit 35 calculates the target code amount Ti by means of Equation (1) or (4).

In addition, in step S34, when the picture of interest is the I picture, the rate control unit 35 calculates the target code amount Ti as shown in FIG. 2B in accordance with the change in parameters R, Kb, and Kp in the process of step S33.

In addition, the rate control unit 35 calculates the target code amount Tp as shown in FIG. 2B when the picture of interest is the P picture, and calculates the target code amount Tb as shown in FIG. 2B when the picture of interest is the B picture.

In step S35, the rate control unit 35 calculates the quantization scale in the picture of interest by the second and third steps in TM5 based on the target code amount T calculated in step S34, and supplies the quantization scale to the quantization unit 25.

In addition, in step S32, when the rate control unit 35 determines that the rapid zoom is not initiated based on the detected state of zoom, the process proceeds to step S36, step S36 and step 37 are skipped, and the process proceeds to step S34.

In step S34, the rate control unit 35 calculates the target code amount T of the picture of interest by the first step in TM5 using the current parameters R, Kb, and Kp, and the same processes are carried out from then on.

In addition, when the rate control unit 135 determines that the rapid zoom is initiated in step S32, the process proceeds to step S36 until the process of S37 is carried out after it is determined that the rapid zoom is finished.

In step S36, the rate control unit 35 determines whether or not the rapid zoom is finished based on the detected state of zoom.

When the rate control unit 35 determines that the rapid zoom is not finished but carried out based on the detected state of zoom, the process proceeds to step S34.

In step S34, the rate control unit 35 calculates the target code amount T of the picture of interest by the first step in TM5 using the parameters R, Kb, and Kp that are already changed in step S33 when the rapid zoom is initiated, and the process proceeds to step S35.

Accordingly, when the rapid zoom is carried out, in step S34, the rate control unit 35 sufficiently calculates the target code amounts Tp and Tb of the respective P and B pictures compression coded with reference to the reference frame.

In addition, in step S36, when the rate control unit 35 determines that the rapid zoom is finished based on the detected state of zoom, the process proceeds to the step S37.

In step S37, the rate control unit 35 performs adjustment such that the target code amounts Ti and Tp of the respective I and P pictures that are referred to as the reference frames are increased by changing at least one of the current parameters R, Kb, and Kp, and the process proceeds to step S34.

In step S34, the rate control unit 35 then calculates the target code amount T of the picture of interest by the first step in TM5 using the parameters R, Kb, and Kp that are changed in the process of step 37.

That is, for example, in step S34, when the picture of interest is the I picture, the rate control unit 35 calculates the target code amount Ti as shown in FIG. 2A in accordance with the change in parameters R, Kb, and Kp in the process of step S37.

In addition, the rate control unit 35 calculates the target code amount Tp as shown in FIG. 2A when the picture of interest is the P picture and the target code amount Tb as shown in FIG. 2A when the picture of interest is the B picture.

Accordingly, when the rapid zoom is finished, in step S34, the rate control unit 35 sufficiently calculates the target code amounts Ti and Tp of the respective I and P pictures that are referred to as the reference frames.

After the process of step S34 is finished, the process proceeds to step S35, and the same processes are carried out from then on.

Figure 3:
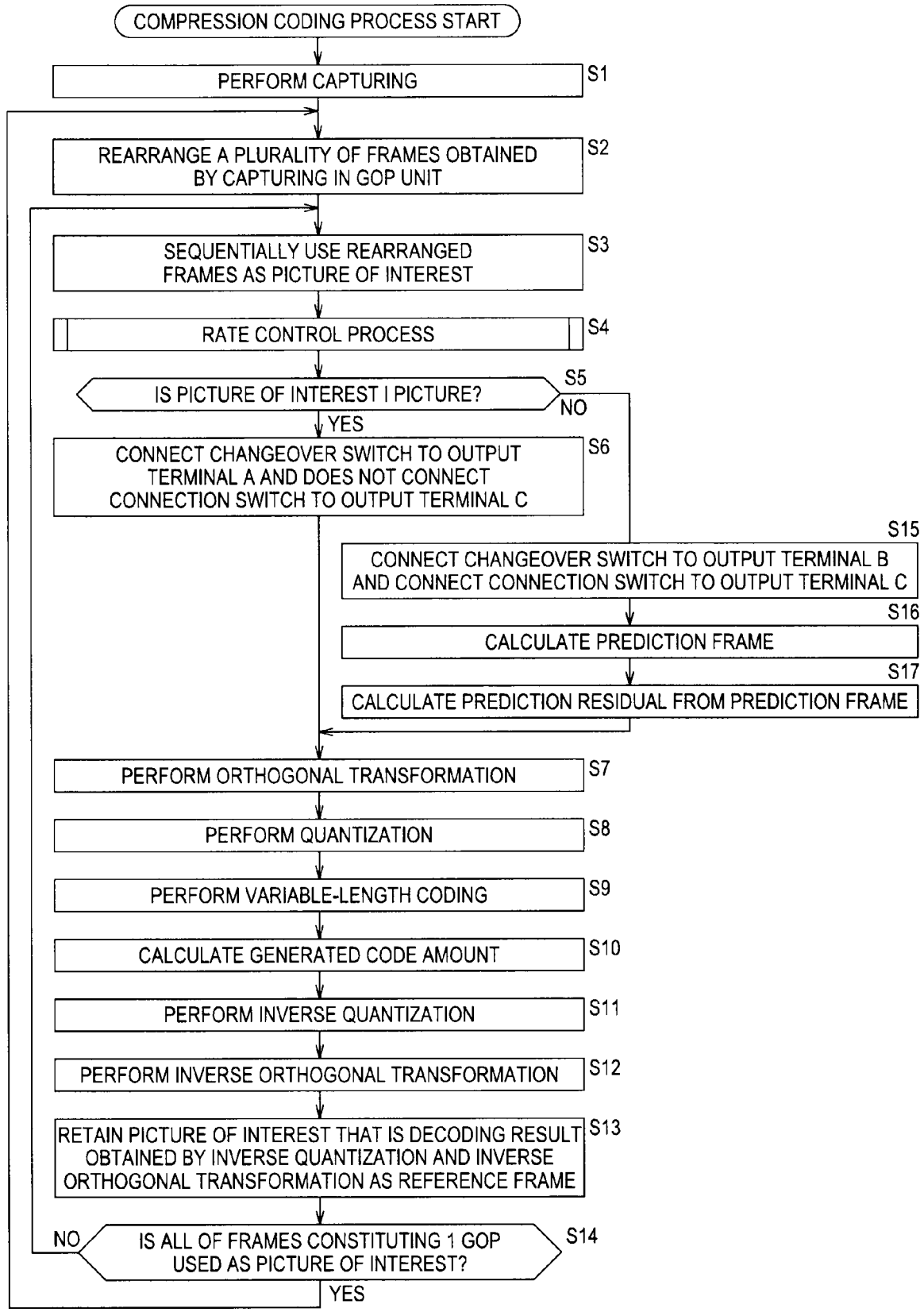
FIG. 3 is a flow chart illustrating a compression coding process carried out by a digital video camera.
Figure 4:
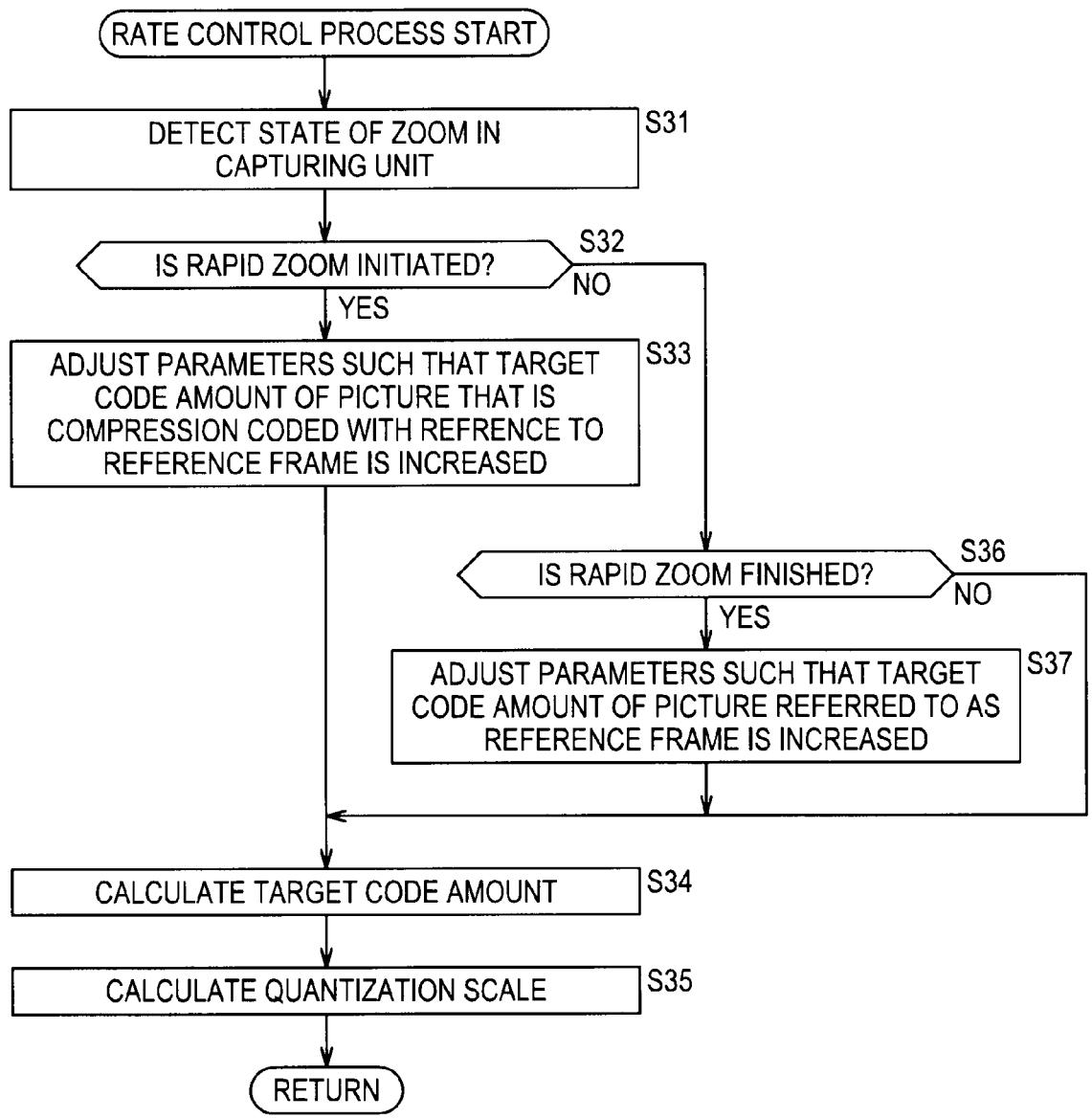
FIG. 4 is a flow chart illustrating details of a rate control process.

The rate control process is thus finished, and the process returns to step S4 of FIG. 3 and proceeds to step S5.

As described above, according to the rate control process in the compression coding process, when the rapid zoom is carried out in the capturing unit 21, the rate control unit 35 sufficiently calculates the target code amounts Tp and Tb of the respective P and B pictures that are compression coded with reference to the reference frames.

As a result, even when the prediction residuals $P_{MB}$ and $B_{MB}$ are increased due to the rapid zoom carried out in the capturing unit 21, for example, it is possible to suppress the loss of image information in the P and B pictures at the time of quantization and thus to inhibit the image degradation at the time of decoding.

In addition, for example, when the prediction residuals $P_{MB}$ and $B_{MB}$ are decreased because the rapid zoom is not carried out in the capturing unit 21, the rate control unit 35 sufficiently calculates the target code amounts Ti and Tp of the respective I and P pictures referred to as the reference frames.

As a result, it is possible to suppress the loss of image information at the time of quantization in the I and P pictures referred to as the reference frames. In addition, it is possible to more decrease the prediction residuals $P_{MB}$ and $B_{MB}$ of the respective P and B pictures that are compression coded with reference to the reference frames, and it is also possible to inhibit the image degradation at the time of decoding.

2. Modification

In the present embodiment, the target code amounts Ti, Tp, and Tb are adjusted in accordance with the state of zoom of the capturing unit 21 at the time of capturing the picture of interest, however, the state of the capturing unit 21 that is referred to at the time of adjusting the target code amount Ti, Tp, and Tb is not limited thereto.

That is, for example, at least one of the state of zoom of the capturing unit 21, the state of focus of the capturing unit 21 (e.g., whether the focus is changed, and so forth), the movement of the capturing unit 21 and so forth (e.g., pan, tilt, hand blurring, and so forth), and the state of exposure of the capturing unit 21 (e.g., whether the exposure is made) may be employed as the state of the capturing unit 21 at the time of capturing the picture of interest.

Such states are detected, for example, by the rate control unit 35 in accordance with the operation signal from the operation unit 36. In addition, an acceleration sensor may be disposed in the capturing unit 21, and the state of the moving capturing unit 21 (e.g., a speed of the movement, and so forth) may be calculated from the acceleration detected by the acceleration sensor disposed in the capturing unit 21.

In particular, for example, when the state of focus of the capturing unit 21 is employed as the state of the capturing unit 21, the state of focus is detected in step S31. It is then determined whether or not the change in focus is initiated in accordance with the detected state of focus in step S32, and it is determined whether or not the change is focus is finished in step S36. In this case, the process of step S33 is carried out when it is determined that the change in focus is initiated, and the process of step S37 is carried out when it is determined that the change in focus is finished.

In addition, for example, when the state of the moving capturing unit 21 is employed as the state of the capturing unit 21, the state of the moving capturing unit 21 is detected in step S31. It is then determined whether or not the movement of the capturing unit is initiated at a speed equal to or higher than a predetermined threshold value th2 in accordance with the state of the moving capturing unit 21 in step S32, and it is determined whether or not the movement at the speed equal to or higher than the predetermined threshold value th2 is finished in step S36. In this case, the process of step S33 is carried out when it is determined that the movement is initiated at the speed equal to or higher than the predetermined threshold value th2, and the process of step S37 is carried out when it is determined that the movement at the speed equal to or higher than the predetermined threshold value th2 is finished.

In addition, for example, when the state of exposure of the capturing unit 21 is employed as the state of the capturing unit 21, the state of exposure of the capturing unit 21 is detected in step S31. It is then determined whether or not the change in exposure is initiated in accordance with the state of exposure in step S32, and it is determined whether or not the change in exposure is finished in step S36. In this case, the process of step S33 is carried out when it is determined that the change in exposure is initiated, and the process of step S37 is carried out when it is determined that the change in exposure is finished.

In addition, for example, when plural states are employed as the state of the capturing unit 21, it is determined whether or not the process of step S33 is to be carried out per each of the plural states in step S32. The process of step S33 is then carried out when it is determined that the process of step S33 is to be carried out based on any one state of the plural states.

In particular, for example, it is determined that the process using the capturing unit 21 (e.g., the process of at least one of a rapid zoom, a change in focus, a movement of the capturing unit 21, a change in exposure, and so forth) is initiated in step S32, the process of step S33 is carried out.

When it is determined that all processes initiated in the capturing unit 21 are finished (e.g., when it is determined that none of the rapid zoom, the change in focus, the movement of the capturing unit 21, the change in exposure, and so forth is carried out) in step S36, the process proceeds to step S37.

In the present embodiment, the digital video camera 1 compression codes the frame using the MPEG coding scheme, however, the method of compression coding the frame is not limited to the MPEG coding scheme but may employ, for example, advanced video coding (AVC), and so forth.

In addition, in the AVC, for example, not only the I and P pictures but also the B picture becomes the reference frame. In this case, the parameters are changed such that the target code amount Ti is decreased and any of the target code amounts Tp and Tb is increased in step S33 of FIG. 4. The parameters are then changed such that any of the target code amounts Ti, Tp, and Tb is increased in step S37 of FIG. 4.

In addition, besides the frame, it is possible to perform compression coding on the field as a target.

In the present embodiment, the transformation coefficients are biased by performing orthogonal transformation so as to effectively perform variable-length coding, however, the process of causing the transformation coefficients to be biased is not limited to the orthogonal transformation.

That is, for example, instead of the orthogonal transformation, a differential pulse code modulation (DPCM) coding scheme that calculates prediction values of pixels from adjacent pixels and calculates the difference between the prediction values and the pixel values of the pixels as the transformation coefficient. In addition, the prediction values are values that are biased in terms of difference of each pixel.

In addition, in the present embodiment, the rate control unit 35 calculates the quantization scale by means of algorithm using TM5. However, the algorithm for calculating the quantization scale is not limited to TM5 but may employ other algorithms.

In the present embodiment, a case of applying the present technology to the digital video camera is described, however, the present technology may be applied to other electronic apparatuses. That is, the present technology may be applied to any devices as long as the images obtained by capturing are compression coded as the prediction residuals.

In addition, the present technology may employ configurations below.

(1) A coding device including: an adjustment unit configured to adjust a target code amount that is a target of a code amount when coding a coding object image, based on a state of a capturing unit at the time of capturing the coding object image that is an object of coding; and a coding unit configured to code the coding object image in accordance with the adjusted target code amount.

(2) The coding device according to (1), wherein the adjustment unit may perform adjustment by allocating a larger target code amount to one of a first coding object image coded with reference to a prediction image obtained by predicting the coding object image and a second coding object image referred to as the prediction image, based on the state of the capturing unit.

(3) The coding device according to (2), wherein the adjustment unit may adjust the target code amount based on a state of zoom of the capturing unit at the time of capturing the coding object image.

(4) The coding device according to (3), wherein the adjustment unit may perform adjustment by allocating the larger target code amount to the first coding object image when the zoom is performed at a speed having a predetermined threshold value or higher and allocating the larger target code amount to the second coding object image when the zoom performed at the speed having the predetermined threshold value or higher is finished.

(5) The coding device according to (2), wherein the adjustment unit may adjust the target code amount based on a state of focus of the capturing unit at the time of capturing the coding object image.

(6) The coding device according to (5), wherein the adjustment unit may perform adjustment by allocating the larger target code amount to the first coding object image when the focus is changed and allocating the larger target code amount to the second coding object image when the change in focus is finished.

(7) The coding device according to (2), wherein the adjustment unit may adjust the target code amount based on a state of movement of the capturing unit at the time of capturing the coding object image.

(8) The coding device according to (7), wherein the adjustment unit may perform adjustment by allocating the larger target code amount to the first coding object image when the capturing unit moves at a speed having a predetermined threshold value or higher and allocating the larger target code amount to the second coding object image when the movement of the capturing unit at the speed having the predetermined threshold value or higher is finished.

(9) The coding device according to (2), wherein the adjustment unit may adjust the target code amount based on a state of exposure of the capturing unit at the time of capturing the coding object image.

(10) The coding device according to (9), wherein the adjustment unit may perform adjustment by allocating the larger target code amount to the first coding object image when the exposure is changed and allocating the larger target code amount to the second coding object image when the change in exposure is finished.

(11) The coding device according to (2) to (10), further including: a detection unit configured to detect the state of the capturing unit at the time of capturing the coding object image, in accordance with a user operation on the capturing unit, wherein the adjustment unit may adjust the target code amount based on the detected state of the capturing unit.

However, the series of processes described above may be executed by hardware and may be executed by software. When the series of processes is executed by the software, a program constituting the software is installed, from the program recording medium, on a computer embedded in a dedicated hardware or a computer such as a general-purpose computer where various programs can be installed to execute various functions.

Configuration Example of Computer

Figure 5:
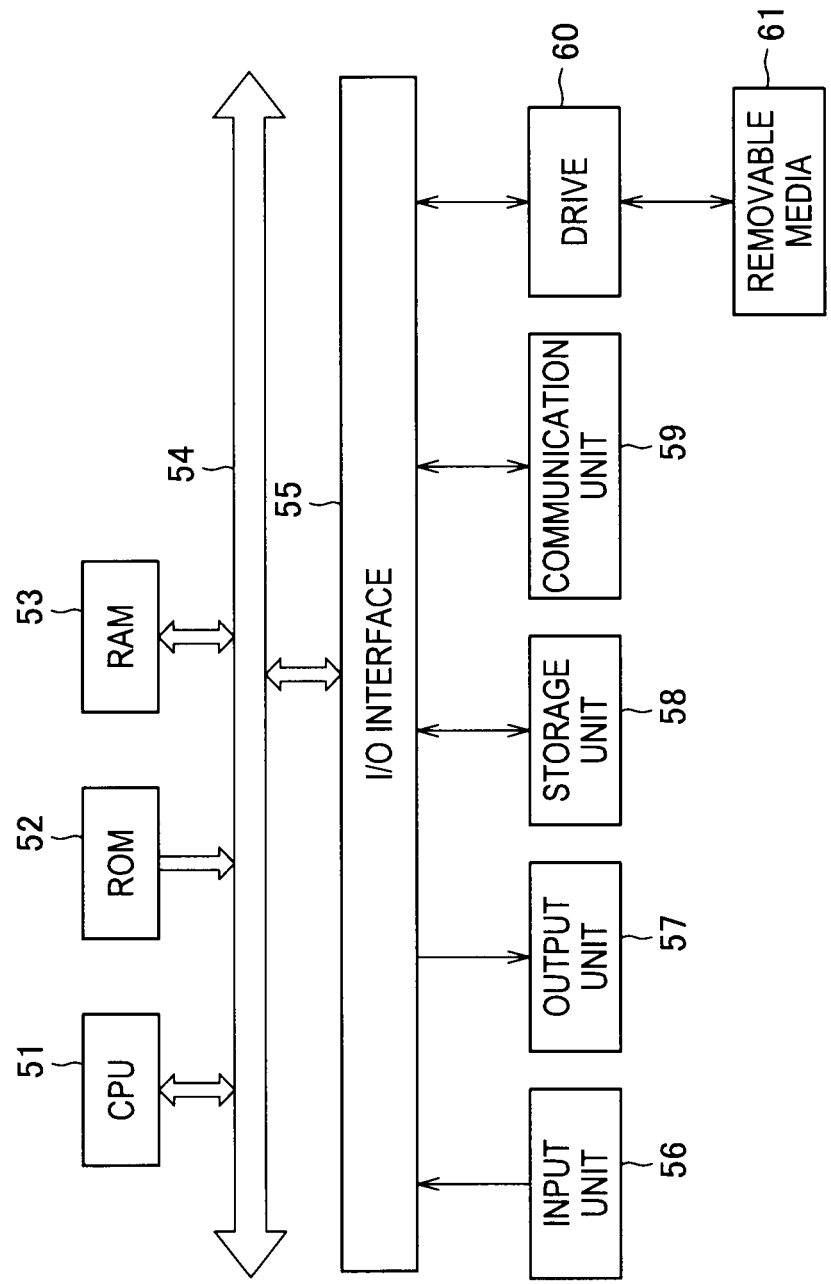
FIG. 5 is a block diagram illustrating a configuration example of a computer.

FIG. 5 is a diagram illustrating an example of a computer hardware configuration in which the series of processes described above is executed by the program.

The central processing unit (CPU) 51 executes various processes in accordance with the program stored in the read only memory (ROM) 52 or the storage unit 58. The program executed by the CPU 51, data, and so forth are properly stored in the random access memory (RAM) 53. The CPU 51, the ROM 52, and the RAM 53 are interconnected by the bus 54.

The input and output interface 55 is also connected to the CPU 51 through the bus 54. The input unit 56 such as a keyboard, a mouse, a microphone and so forth, and the output unit 57 such as a display, a speaker, and so forth are connected to the input and output interface 55. The CPU 51 executes various processes in accordance with the instruction input from the input unit 56. The CPU 51 then outputs the processed result to the output unit 57.

The storage unit 58 connected to the input and output interface 55, for example, includes a hard disc, and stores various data or program executed by the CPU 51. The communication unit 59 is in communication with external devices through a network such as Internet or local area network.

In addition, the program may be acquired through the communication unit 59 and stored in the storage unit 58.

When the removable media 61 such as a magnetic disc, an optical disc, a magneto-optical disc, and a semiconductor memory, and so forth is mounted on the drive, the drive 60 connected to the input and output interface 55 drives the removable media and acquires programs or data recorded on the removable media. The acquired programs or data is transmitted to the storage unit 58 and stored in the storage unit as necessary.

A recording medium that is installed in the computer and records (stores) the program that can be executed by the computer includes the removable media 61 such as magnetic discs (including a flexible disc), optical discs (including a compact disc-read only memory (CD-ROM) and a digital versatile disc (DVD)), and magneto-optical discs (including a mini-disc (MD)), and a package media composed of semiconductor memories or the like, the ROM 52 temporarily or permanently storing the program, hard discs constituting the storage unit 58, and so forth as shown in FIG. 5. Recording the program onto the recording medium is performed using wired or wireless communication media such as local area network, Internet, and digital satellite broadcasting through the communication unit 59 that is the interface such as routers, modems, and so forth as necessary.

In addition, the steps of describing the series of processes in the present specification include not only the processes carried out in a time-series way in the described order but also the processes carried out in a parallel or individual way even when the processes are not necessarily processed in the time-series way.

In addition, in the present specification, the term system means a general device composed of a plurality of devices.

In addition, the present technology is not limited to the embodiment described above, but various changes may occur without departing from the subject matter of the present technology.

The present disclosure contains subject matter related to that disclosed in Japanese Priority Patent Application JP 2011-114904 filed in the Japan Patent Office on May 23, 2011, the entire content of which is hereby incorporated by reference.

What is claimed is:

1. A coding device comprising:
    a computer processing unit operable to:
        adjust a target code amount for picture frames of a picture, based on a state of a capturing unit at a time of capturing the picture; and
        code the picture frames in accordance with the adjusted target code amount,
    wherein the picture frames comprise one or more I picture frames, one or more P picture frames and one or more B picture frames,
    wherein the adjustment of the target code amount is performed by increment of the target code amount of a P picture frame of said one or more P picture frames and increment of the target code amount of a B picture frame of said one or more B picture frames when the state of the capturing unit is varying,
    wherein the adjustment of the target code amount is performed by increment of the target code amount of the P picture frame and decrement of the target code amount of the B picture frame when the state of the capturing unit is not varying.

2. The coding device according to claim 1, wherein the state of the capturing unit is a state of zoom at the time of capturing the picture.

3. The coding device according to claim 2, wherein the computer processing unit is operable to perform adjustment of the target code amount of the picture frames when zooming is performed at a speed having a predetermined threshold value or higher and when the zooming performed at the speed having the predetermined threshold value or higher is finished.

4. The coding device according to claim 1, wherein the state of the capturing unit is a state of focus at the time of capturing the picture.

5. The coding device according to claim 4, wherein the computer processing unit is operable to perform adjustment of the target code amount of the picture frames when the state of focus is changed.

6. The coding device according to claim 1, wherein the state of the capturing unit is a state of movement at the time of capturing the picture.

7. The coding device according to claim 6, wherein the computer processing unit is operable to perform adjustment of the target code amount of the picture frames when the capturing unit moves at a speed having a predetermined threshold value or higher.

8. The coding device according to claim 1, wherein the state of the capturing unit is a state of exposure at the time of capturing the picture.

9. The coding device according to claim 8, wherein the computer processing unit is operable to perform adjustment of the target code amount of the picture frames when the state of exposure is changed.

10. The coding device according to claim 1, wherein the computer processing unit is operable to detect the state of the capturing unit at the time of capturing the picture, in accordance with a user operation on the capturing unit, wherein the computer processing unit is operable to adjust the target code amount of the picture frames based on the detected state of the capturing unit.

11. The coding device according to claim 1, wherein the adjustment of the target code amount is performed by decrement of the target code amount of an I picture frame of said one or more I picture frames when the state of the capturing unit is varying.

12. The coding device according to claim 1, wherein the adjustment of the target code amount is performed by increment of the target code amount of the I picture frame when the state of the capturing unit is not varying.

13. A coding method in a coding device that codes an image, the coding method comprising:
    adjusting a target code amount for picture frames of a picture based on a state of a capturing unit at a time of capturing the picture; and
    coding the picture frames in accordance with the adjusted target code amount,
    wherein the picture frames comprise one or more I picture frames, one or more P picture frames and one or more B picture frames,
    wherein the adjustment of the target code amount is performed by increment of the target code amount of a P picture frame of said one or more P picture frames and increment of the target code amount of a B picture frame of said one or more B picture frames when the state of the capturing unit is varying,
    wherein the adjustment of the target code amount is performed by increment of the target code amount of the P picture frame and decrement of the target code amount of the B picture frame when the state of the capturing unit is not varying.

14. The method of claim 13, wherein the adjustment of the target code amount is performed by decrement of the target code amount of an I picture frame of said one or more I picture frames when the state of the capturing unit is varying.

15. The method of claim 13, wherein the adjustment of the target code amount is performed by increment of the target code amount of the I picture frame when the state of the capturing unit is not varying.

16. A non-transitory computer-readable storage medium having stored thereon, a computer program having at least one code section for coding, said at least one code section being executable by a computer for causing said computer to perform steps comprising:
    adjusting a target code amount for picture frames of a picture, based on a state of a capturing unit at a time of capturing the picture; and
    coding the picture frames in accordance with the adjusted target code amount,
    wherein the picture frames comprise one or more I picture frames, one or more P picture frames and one or more B picture frames,
    wherein the adjustment of the target code amount is performed by increment of the target code amount of a P picture frame of said one or more P picture frames and increment of the target code amount of a B picture frame of said one or more B picture frames when the state of the capturing unit is varying,
    wherein the adjustment of the target code amount is performed by increment of the target code amount of the P picture frame and decrement of the target code amount of the B picture frame when the state of the capturing unit is not varying.

17. The non-transitory computer-readable storage medium of claim 16, wherein the adjustment of the target code amount is performed by decrement of the target code amount of an I picture frame of said one or more I picture frames when the state of the capturing unit is varying.

\* \* \* \* \*